United States Patent
Galloway, III

[11] Patent Number: 6,003,826
[45] Date of Patent: Dec. 21, 1999

[54] SUPPORTING SYSTEM FOR PATIO DECK ACCESSORIES

[76] Inventor: William F. Galloway, III, 83 Elmwood Rd., Lunenburg, Mass. 01462

[21] Appl. No.: 09/120,587

[22] Filed: Jul. 22, 1998

Related U.S. Application Data

[60] Provisional application No. 60/054,097, Jul. 29, 1997.

[51] Int. Cl.$^6$ .................................................. F16M 13/00
[52] U.S. Cl. ................................. 248/519; 248/534
[58] Field of Search ................... 248/158, 511, 248/512, 513, 514, 515, 518, 519, 534, 535, 539, 544, 532, 540, 229.1, 346.03, 346.06, 346.01, 910, 219.1, 219.2, 224.2, 230.1, 226.11; 211/87.01, 218.4; 135/16, 20.1, 27

[56] References Cited

U.S. PATENT DOCUMENTS

| | | | |
|---|---|---|---|
| 194,169 | 8/1877 | Pettibone | 248/514 |
| 541,951 | 7/1895 | Slyder . | |
| 683,513 | 10/1901 | Sprague | 248/534 |
| 694,888 | 3/1902 | Pfluger | 248/514 |
| 697,687 | 4/1902 | Sprague . | |
| 719,268 | 1/1903 | Slyder . | |
| 970,751 | 9/1910 | Pranke | 248/515 |
| 2,686,029 | 8/1954 | Raymond | 248/539 |
| 2,756,760 | 7/1956 | Grotteria . | |
| 2,988,310 | 6/1961 | Wright . | |
| 3,295,473 | 1/1967 | Wentworth | 108/152 |
| 3,955,786 | 5/1976 | Duddy | 248/537 |
| 4,582,287 | 4/1986 | DeLeary . | |
| 5,313,910 | 5/1994 | Wittman | 119/57.9 |
| 5,354,031 | 10/1994 | Bilotti | 248/519 |
| 5,508,895 | 4/1996 | Wagoner, Jr. | 362/61 |
| 5,544,851 | 8/1996 | Moore | 248/544 |
| 5,685,517 | 11/1997 | Salibra | 248/519 |

*Primary Examiner*—Ramon O. Ramirez
*Assistant Examiner*—Tan Le
*Attorney, Agent, or Firm*—Blodgett & Blodgett, P.C.

[57] ABSTRACT

An accessory for a patio deck having a floor and a peripheral railing. The accessory includes a stand for being fastened to the floor of the patio deck, a bracket for being fastened to the upper bar of the railing and a post having a lower end mounted in a bore of the stand and an upper end extending through an aperture in the bracket. The invention also includes a bracket for a patio deck accessory which includes a post and wherein the bracket is adaptable for supporting posts of different thicknesses.

7 Claims, 5 Drawing Sheets

SUPPORTING SYSTEM FOR PATIO DECK ACCESSORIES

CROSS-REFERENCE TO RELATED APPLICATIONS

This application claims the benefit under 35 U.S.C. §119 (e) of prior U.S. Provisional Application No. 60/054,097, filed Jul. 29, 1997.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention relates generally to patio accessory items, such as umbrella, clothes rack, bird feeders and plant hangers. The invention also relates to a supporting apparatus for patio accessory items. Such accessory items are used commonly on patio decks in connection with tables. The table has a hole in its center to which the staff of the accessory extends in a sandbag for supporting the bottom of the staff. The prior art accessory items and supporting apparatus limit the way in which the accessories, such as umbrellas can be used on a patio. These and other difficulties experienced with the prior art accessory items and support apparatus have been obviated by the present invention.

It is, therefore, a principal object of the invention to provide an accessory which can be used anywhere along the peripheral railing of a patio deck.

A further object of the invention is the provision of an accessory supporting apparatus for a patio deck that can be fastened anywhere along the peripheral railing of the patio deck.

Another object of the invention is the provision of a support bracket for a patio deck accessory which enables the accessory to be supported by the peripheral railing of the patio deck.

A still further object of the invention is the provision of a support bracket for a patio deck accessory that includes a supporting post and wherein the support bracket is attachable to the peripheral railing of the patio deck and is adaptable for supporting posts of different diameters.

With these and other objects in view, as will be apparent to those skilled in the art, the invention resides in the combination of parts set forth in the specification and covered by the claims appended hereto.

SUMMARY OF THE INVENTION

An accessory for a patio deck having a floor and a peripheral railing. The accessory includes a stand for being fastened to the floor of the patio deck, a bracket for being fastened to the upper bar of the railing and a post having a lower end mounted in a bore of the stand and an upper end extending through an aperture in the bracket. The invention also includes a bracket for a patio deck accessory that includes a post and wherein the bracket is adaptable for supporting posts of different widths.

DETAILED DESCRIPTION OF THE INVENTION

Figure 1:
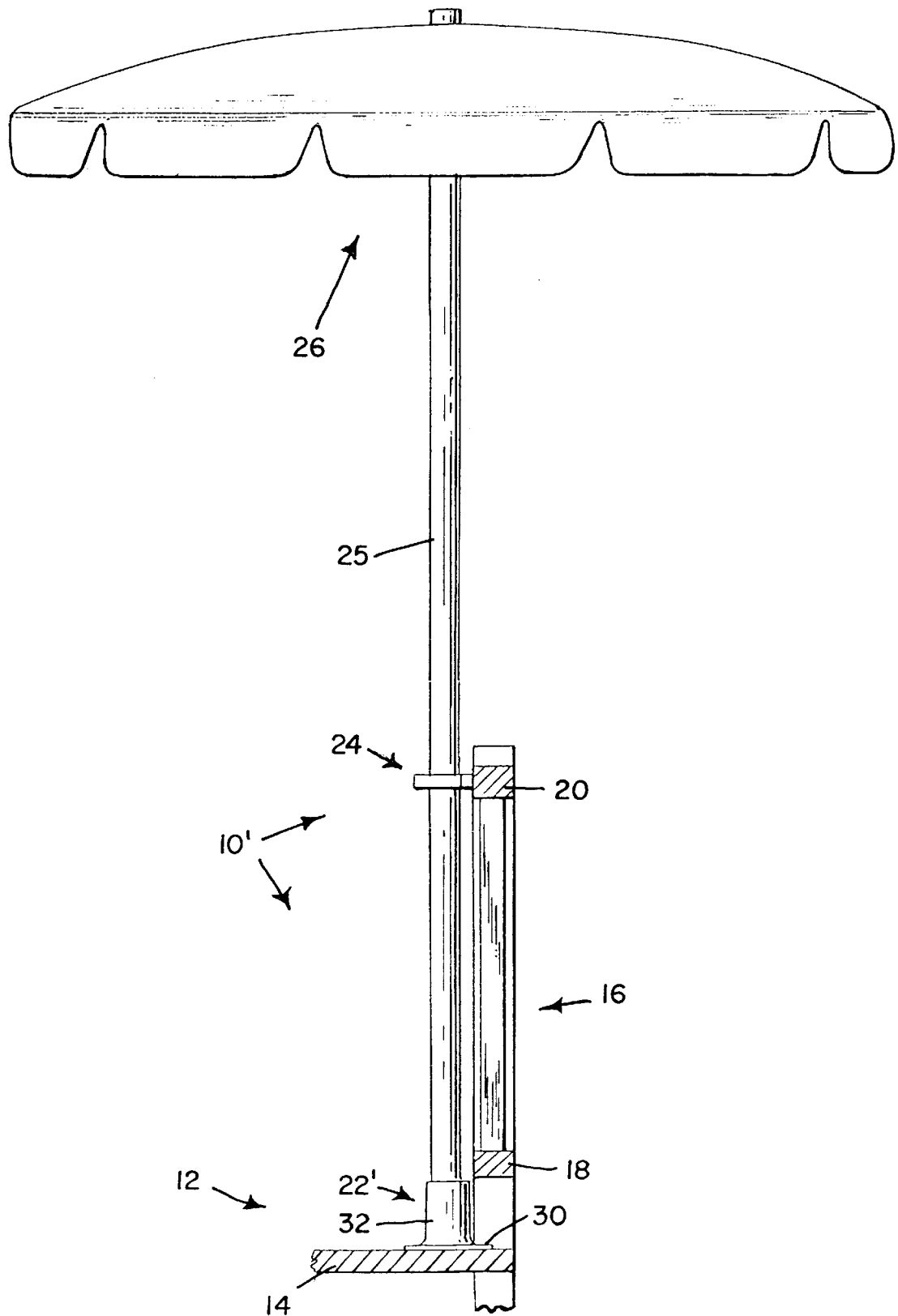
FIG. 1 is a side elevational view of an accessory for a patio deck embodying the principles of the present invention and employing a relatively large supporting post.
Figure 2:
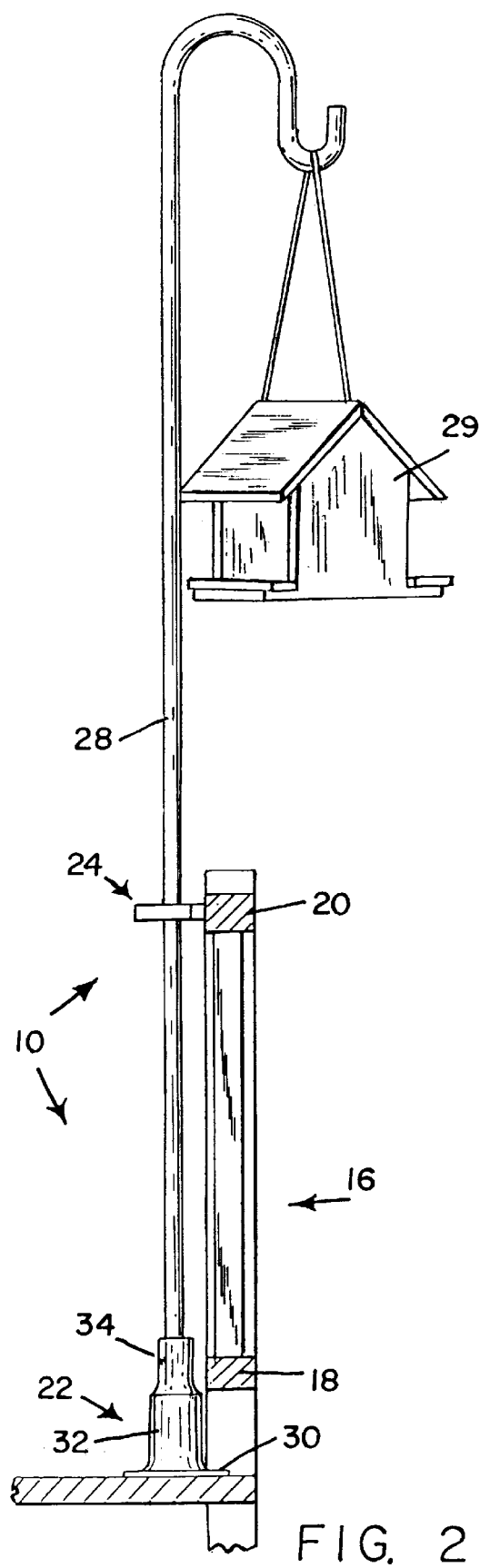
FIG. 2 is a view similar to FIG. 1 showing an accessory item of the present invention which includes a relatively small diameter supporting post.
Figure 3:
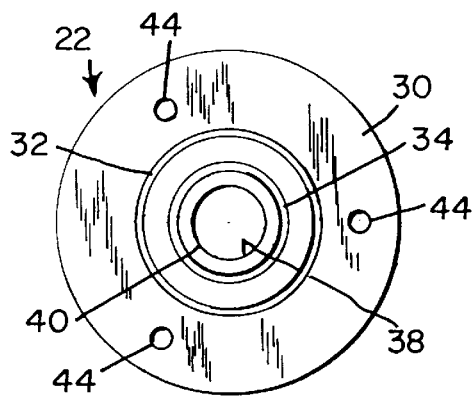
FIG. 3 is a top plan view of the stand portion of the accessory of FIG. 2.
Figure 4:
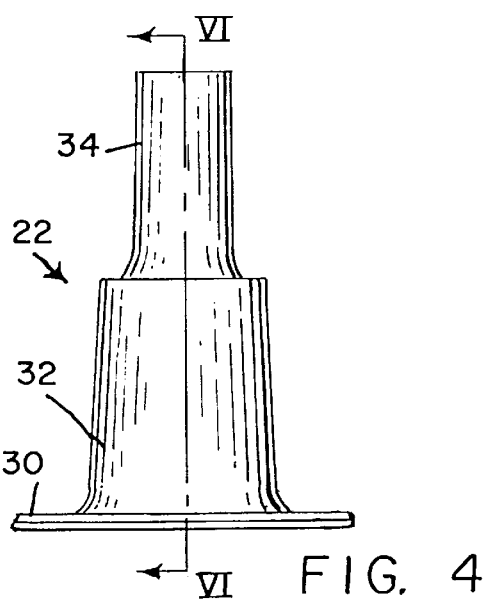
FIG. 4 is a side elevational view of the stand of FIG. 2.
Figure 5:
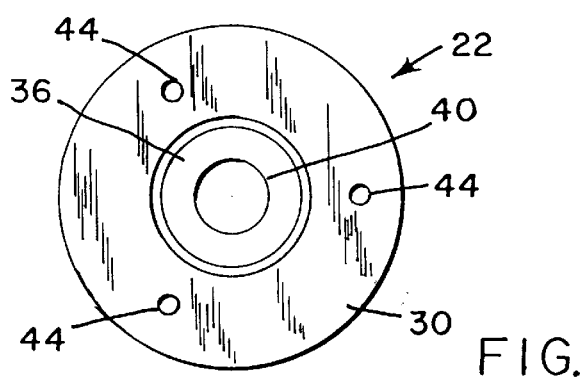
FIG. 5 is a bottom plan view of the stand of FIG. 2.
Figure 10:
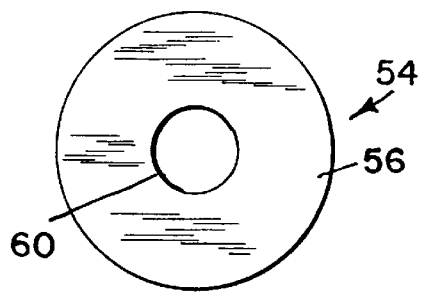
FIG. 10 is a top plan view of an inset or adapter for the bracket.

Referring first to FIGS. 1 and 2, the accessory of the present invention is generally indicated by the reference numeral 10 in FIG. 2 and 10' in FIG. 2 and is shown applied to a patio deck, generally indicated by the reference numeral 12. Patio deck 12 includes a floor 14 and a peripheral railing structure generally indicated by the reference numeral 16. The railing structure 16 includes a lower horizontal bar 18 and an upper horizontal bar 20. The accessory 10 includes a lower stand, generally indicated by the reference numeral 22, as shown in FIG. 2, and generally indicated by the reference numeral 22' as shown in FIG. 1 and a bracket portion generally indicated by the reference numeral 24. The stand 22 is fastened to the floor 14. The bracket 24 is fastened to the upper rail 20. The stand 22 and the bracket 24 cooperate to support a relatively small diameter tubular post 28 of the type commonly used for supporting plant hangers and bird feeders, such as the bird feeder 29.

Referring specifically to FIG. 1, the accessory 10' includes the bracket 24 and a stand 22'. The stand 22 and the bracket 24 cooperate to support a relatively large diameter post 25 which supports an umbrella, generally indicated by the reference numeral 26. Dryer rocks also employ a similar large diameter post.

Referring specifically to FIGS. 3–6, the stand 22 includes a flat horizontal base 30, a lower relatively large diameter tubular section 32 and an upper relatively small diameter tubular section 34. The lower large diameter section 32 has a lower cylindrical cavity 36. The upper small diameter section 34 has an upper cylindrical cavity 38. The cavity 38 has an upper opening 40 and a lower opening 42 to the lower cavity 36. The base 30 has a plurality of apertures 44 for receiving fasteners and for enabling the stand 22 to be fixed to the floor of the patio deck.

Figure 6:
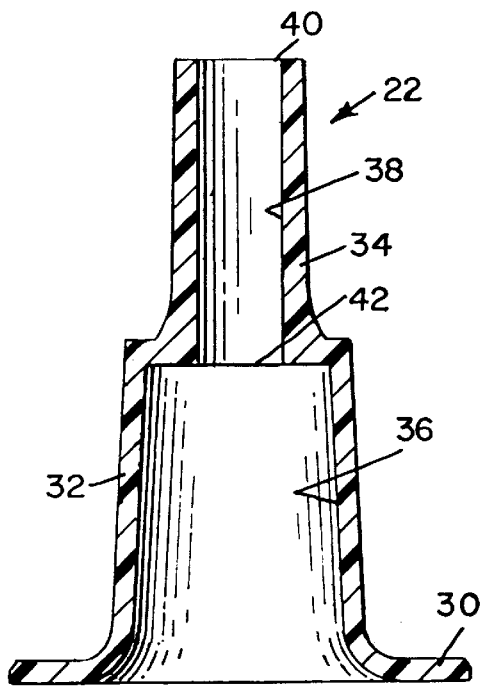
FIG. 6 is a vertical cross-sectional view of the stand of FIG. 2, taken along the line VI—VI of FIG. 4 and looking in the direction of the arrows.
Figure 6A:
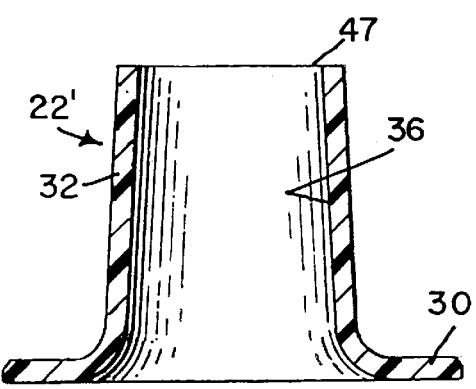
FIG. 6A is a vertical cross-sectional view similar to FIG. 6 showing the stand portion of the accessory of FIG. 1.

The stand 22' as shown in FIG. 6A is identical to the stand 22 except that it does not have the small diameter tubular section 34 and has a relatively large upper opening 45 for accommodating large diameter posts such as post 25 shown in FIG. 1.

Figure 7:
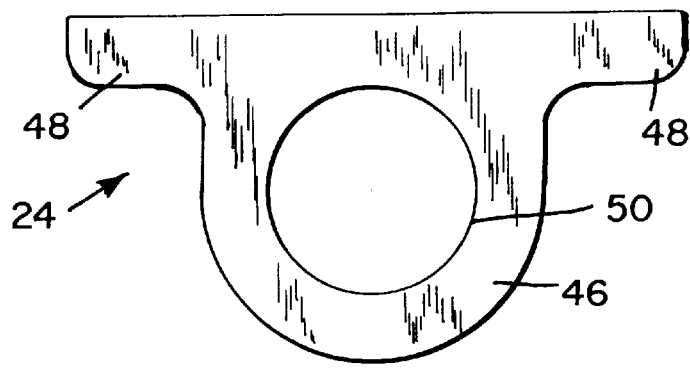
FIG. 7 is a top plan view of the bracket portion of the accessory of FIG. 1.
Figure 8:
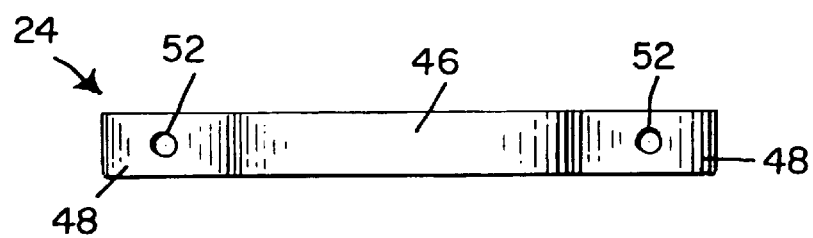
FIG. 8 is a front elevational view of the bracket.
Figure 9:
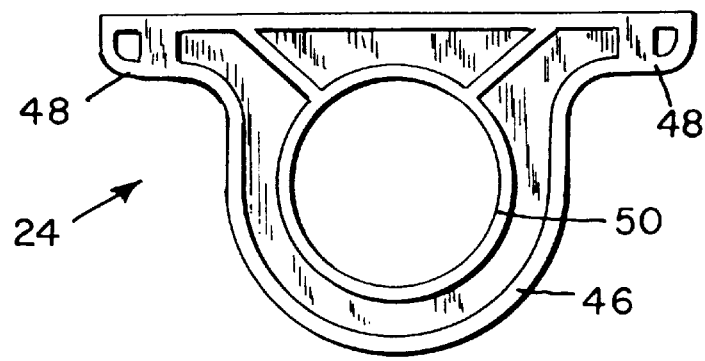
FIG. 9 is a bottom plan view of the bracket.

Referring specifically to FIGS. 7–9, the bracket 24 includes a base portion 46 and a pair of oppositely extending flanges 48. The collar portion 46 has a large circular aperture 50. Each flange 48 has an aperture 52 for receiving fasteners for enabling the bracket 24 to be fixed to the upper bar 20 of the railing structure 16.

Figure 11:
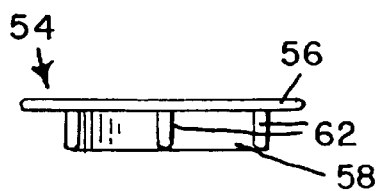
FIG. 11 is a front elevational view of the adapter.
Figure 12:
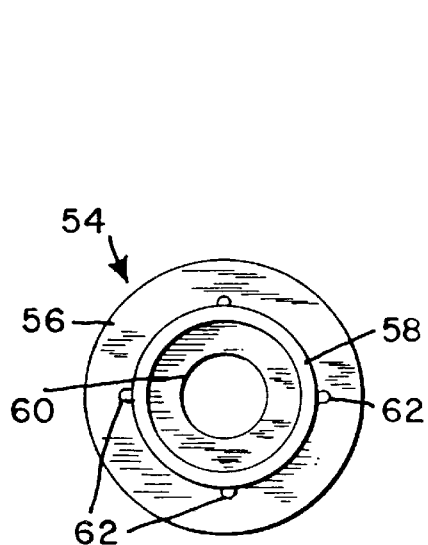
FIG. 12 is a bottom plan view of the adapter.
Figure 13:
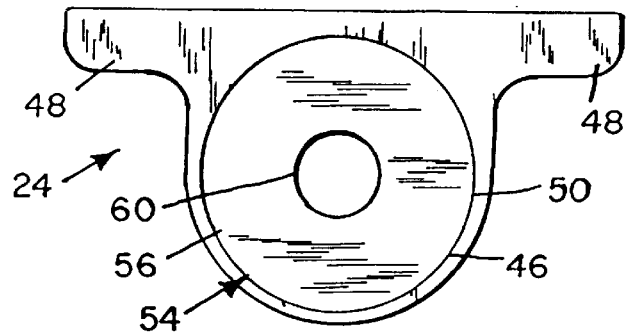
FIG. 13 is top plan view of the adapter and bracket joined together.
Figure 14:
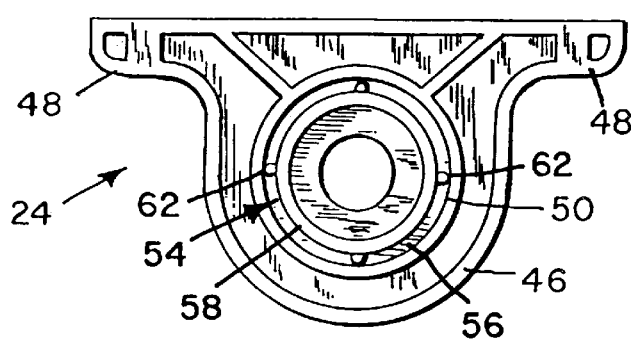
FIG. 14 is a bottom plan view of the bracket and adapter joined together.

Referring to FIGS. 10–12, there is shown an inset or adapter, generally indicated by the reference numeral 54 for use with the bracket 24. The adapter 54 includes a base portion 56 and a collar portion 58. The base portion 56 has an aperture 60 which is concentric with the collar portion 58. A plurality of elongated beads 62 extend along the outer surface of the collar portion 58. The adapter 54 is designed to be coupled with the bracket 24 by inserting the collar portion 58 into the aperture 15 of the bracket 24. The outer diameter of the collar portion 58 is substantially smaller than the diameter of the aperture 50. However, the beads 62 engage the inner cylindrical surface which defines the aperture 50 in a snug interference fit. The adapter 54 fits into the aperture 50 of the collar section 46 snugly enough to remain in place. However, the adapter 54 can be removed relatively easily by holding the upper bracket portion 24 in both hands and pressing the adapter 54 toward the upper surface of the bracket with both thumbs. The adapter 56 effectively reduces the size of the aperture in the collar section 46 of the bracket 24 for enabling the bracket 24 to be used for relatively small diameter posts, such as post 28 of the accessory 10. The accessory of the present invention can include one or more additional adapters, each with an aperture which differs in size from aperture 60.

Referring particularly to FIG. 1, the bracket 24 of the accessory 10' is fastened to the upper horizontal bar 20 so that the aperture 50 of the bracket is vertically aligned with the upper opening 44 of the stand 22'. The lower end of the post 25 is inserted through the aperture 50 of the bracket 24 into the stand 22' through the upper opening 47. This provides a firm stable support for the post 25 and umbrella 26.

Referring specifically to FIG. 2, accessory 10 utilizes the relatively small diameter post 28, and the stand 22. The adapter 54 is coupled with the bracket 24 so that the aperture 60 is aligned with the opening 40 of the stand 22 as shown in FIG. 2. The lower end of the post 28 is inserted through the aperture 60 and through the openings 40 and 42 of the lower stand 22 so that the bottom portion of the post 28 is located within the lower stand 22, thereby forming a firm and stable support for the post 28. The post 28, in turn, can be used to support a bird feeder, such as feeder 29, a plant hanger, or any other similar item.

The invention having been thus described, what is claimed as new and desired to be secured by Letters Patent is:

What is claimed is:

1. An accessory for a patio deck having a floor and a peripheral railing which includes a horizontal upper bar spaced from the floor, said accessory comprising:
   (a) a stand having lower horizontal base portion for fastening the stand to said floor adjacent the rail structure, said stand having an upper portion which extends upwardly from the base portion and which contains a vertical bore and a top opening to the bore;
   (b) a bracket having a horizontal flange for fastening the bracket to said upper bar, said bracket having a vertical circular aperture which is vertically aligned with said top opening;
   (c) a post having a lower end located in the bore and an upper end extending through the aperture in said bracket; and
   (d) an adapter comprising:
      (1) a horizontal base portion which has a larger horizontal dimension than said aperture and a vertical cylindrical hole which has a smaller diameter than said aperture; and
      (2) a cylindrical collar portion which extends downwardly from said base portion and which fits snugly within said aperture, said collar portion being concentric with said hole.

2. An accessory as recited in claim 1, wherein said bracket has a vertical cylindrical surface which defines said aperture and said cylindrical collar section has an outer vertical cylindrical surface having a substantially smaller diameter than said aperture and a plurality of beads at said cylindrical surface for engaging said inner cylindrical surface in a snug interference fit.

3. An accessory for a patio deck having a floor and a peripheral railing which includes a horizontal upper bar spaced from the floor, said accessory comprising:
   (a) a stand having lower horizontal base portion for fastening the stand to said floor adjacent the rail structure, said stand having an upper portion which extends upwardly from the base portion and which contains a vertical bore and a top opening to the bore;
   (b) a bracket comprising:
      (1) a horizontal ring shaped central portion having a vertical circular aperture which is vertically aligned with said top opening; and
      (2) a pair of oppositely extending horizontal flanges, each of said flanges having an aperture for receiving a fastener for fastening the bracket to said upper bar;
   (c) a post having a lower end located in the bore and an upper end extending through the aperture in the central portion of said bracket; and
   (d) an adapter comprising:
      (1) a horizontal base section which has a larger horizontal dimension than said aperture and a vertical cylindrical hole which has a smaller diameter than said aperture; and
      (2) a cylindrical collar section which extends downwardly from said base section and which fits snugly within said aperture, said collar section being concentric with said hole.

4. An accessory as recited in claim 3, wherein said bracket has a vertical cylindrical surface which defines said aperture and said cylindrical collar section has an outer vertical cylindrical surface having a substantially smaller diameter than said aperture and a plurality of beads at said cylindrical surface for engaging said inner cylindrical surface in a snug interference fit.

5. A bracket for retaining a vertical post which forms part of an accessory for a patio deck having a peripheral rail which includes a horizontal upper bar, said bracket comprising:
   (a) a horizontal ring-shaped central portion containing a circular aperture;
   (b) a pair of oppositely extending horizontal flanges, each of said flanges having an aperture for receiving a fastener; and
   (c) an adapter comprising:
      (1) a horizontal base section which has a larger horizontal dimension than said aperture and a vertical cylindrical hole which has a smaller diameter than said aperture; and
      (2) a cylindrical collar section which extends downwardly from said base section and which fits snugly within said aperture, said collar section being concentric with said hole.

6. A bracket as recited in claim 5, wherein said central portion has a vertical cylindrical surface which defines said aperture and said cylindrical collar section has an outer vertical cylindrical surface having a substantially smaller diameter than said aperture and a plurality of beads at said cylindrical surface for engaging said inner cylindrical surface in a snug interference fit.

7. An accessory for a patio deck having a floor and a peripheral railing which includes a horizontal upper bar spaced from the floor, said accessory comprising:

(a) a stand having lower horizontal base portion for fastening the stand to said floor adjacent the rail structure, said stand having an upper portion which extends upwardly from the base portion and which contains a vertical bore and a top opening to the bore;

(b) a bracket comprising:
  (1) a horizontal ring-shaped central portion having a vertical circular aperture which is vertically aligned with said top opening; and
  (2) a pair horizontal flanges, one of said flanges extending in a first direction from said central portion and the other of said flanges extending in a second direction from said central portion which is opposite from said first direction, each of said flanges having an aperture for receiving a fastener for fastening the bracket to said upper bar; and (c) a post having a lower end located in the bore and an upper end extending through the aperture in the ring shaped portion of said bracket.

* * * * *